(12) United States Patent
Kito et al.

(10) Patent No.: US 10,859,151 B2
(45) Date of Patent: Dec. 8, 2020

(54) DIFFERENTIAL APPARATUS

(71) Applicant: Honda Motor Co., Ltd., Tokyo (JP)

(72) Inventors: Akira Kito, Wako (JP); Noriyasu Hakuta, Wako (JP); Koji Ono, Wako (JP); Atsushi Saito, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 37 days.

(21) Appl. No.: 16/285,167

(22) Filed: Feb. 25, 2019

(65) Prior Publication Data

US 2019/0271387 A1   Sep. 5, 2019

(30) Foreign Application Priority Data

Mar. 1, 2018 (JP) .................................. 2018-036197

(51) Int. Cl.
*F16H 57/04* (2010.01)

(52) U.S. Cl.
CPC ..... *F16H 57/0424* (2013.01); *F16H 57/0421* (2013.01); *F16H 57/0427* (2013.01); *F16H 57/0483* (2013.01)

(58) Field of Classification Search
CPC .... F16H 57/04; F16H 57/042; F16H 57/0421; F16H 57/0423; F16H 57/0424; F16H 57/0427; F16H 57/0428; F16H 57/043; F16H 57/0457; F16H 57/0476; F16H 57/0483; F16H 48/38; F16H 48/385; F16H 48/40; B60K 2001/001
See application file for complete search history.

(56) References Cited

U.S. PATENT DOCUMENTS

| | | | | |
|---|---|---|---|---|
| 1,775,623 | A | * | 9/1930 | Harry ................... F16H 57/0483 184/13.1 |
| 2008/0035428 | A1 | * | 2/2008 | Omoto .................... F16J 15/324 184/6 |
| 2010/0038174 | A1 | * | 2/2010 | Mordukhovich ... F16H 57/0413 184/6.12 |
| 2019/0170241 | A1 | * | 6/2019 | Nakamura ............... F16H 48/38 |

FOREIGN PATENT DOCUMENTS

| | | | | | |
|---|---|---|---|---|---|
| JP | 08210473 | A | * | 8/1996 | ......... F16H 57/0483 |
| JP | 11132304 | A | * | 5/1999 | ......... F16H 57/0415 |
| JP | 2008-082530 | A | | 4/2008 | |

OTHER PUBLICATIONS

Online Merriam-Webster Dictionary, definition 5 (Year: 2020).*
Merriam-Webster (online) dictionary (Year: 2020).*

* cited by examiner

*Primary Examiner* — Prasad V Gokhale
(74) *Attorney, Agent, or Firm* — Duft & Bornsen, PC

(57) ABSTRACT

A differential apparatus including a rotating body configured to rotate around a rotation axis to transmit power to a differential mechanism, and a groove formed on the rotating body and configured to guide an oil scooped up by rotation of the rotating body inward in a rotation radial direction of the rotating body.

5 Claims, 11 Drawing Sheets

DIFFERENTIAL APPARATUS

CROSS-REFERENCE TO RELATED APPLICATION

This application is based upon and claims the benefit of priority from Japanese Patent Application No. 2018-036197 filed on Mar. 1, 2018, the content of which is incorporated herein by reference.

BACKGROUND OF THE INVENTION

Field of the Invention

This invention relates to a differential apparatus for scooping up oil to conduct lubrication.

Description of the Related Art

There have been known apparatuses that supply oil scooped up by a rotating gear to a differential mechanism. Such an apparatus is described in, for example, Japanese Unexamined Patent Application Publication No. 2008-082530 (JP2008-082530A). The apparatus of JP2008-082530A includes an oil storage that stores oil scooped up by a gear and a closing mechanism that is opened and closed during start of the vehicle so that the oil in the oil storage flows down to a differential mechanism. Thus, the oil is supplied to the differential mechanism during start of the vehicle.

However, in the case of the apparatus of JP2008-082530A, the oil storage and closing mechanism are disposed separately from the differential mechanism, resulting in an increase in part count and upsizing of the apparatus.

SUMMARY OF THE INVENTION

An aspect of the present invention is a differential apparatus including: a rotating body configured to rotate around a rotation axis to transmit power to a differential mechanism; and a groove formed on the rotating body and configured to guide an oil scooped up by rotation of the rotating body inward in a rotation radial direction of the rotating body.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

An embodiment of the present invention will be described with reference to FIGS. 1 to 9B. A differential apparatus 60 according to the embodiment of the present invention forms a power transmission apparatus 100 mounted on a vehicle. The power transmission apparatus 100 uses an electric motor 2 as the driving source of the vehicle and is for use in motor-driven vehicles such as electric vehicles and hybrid vehicles.

Figure 1:
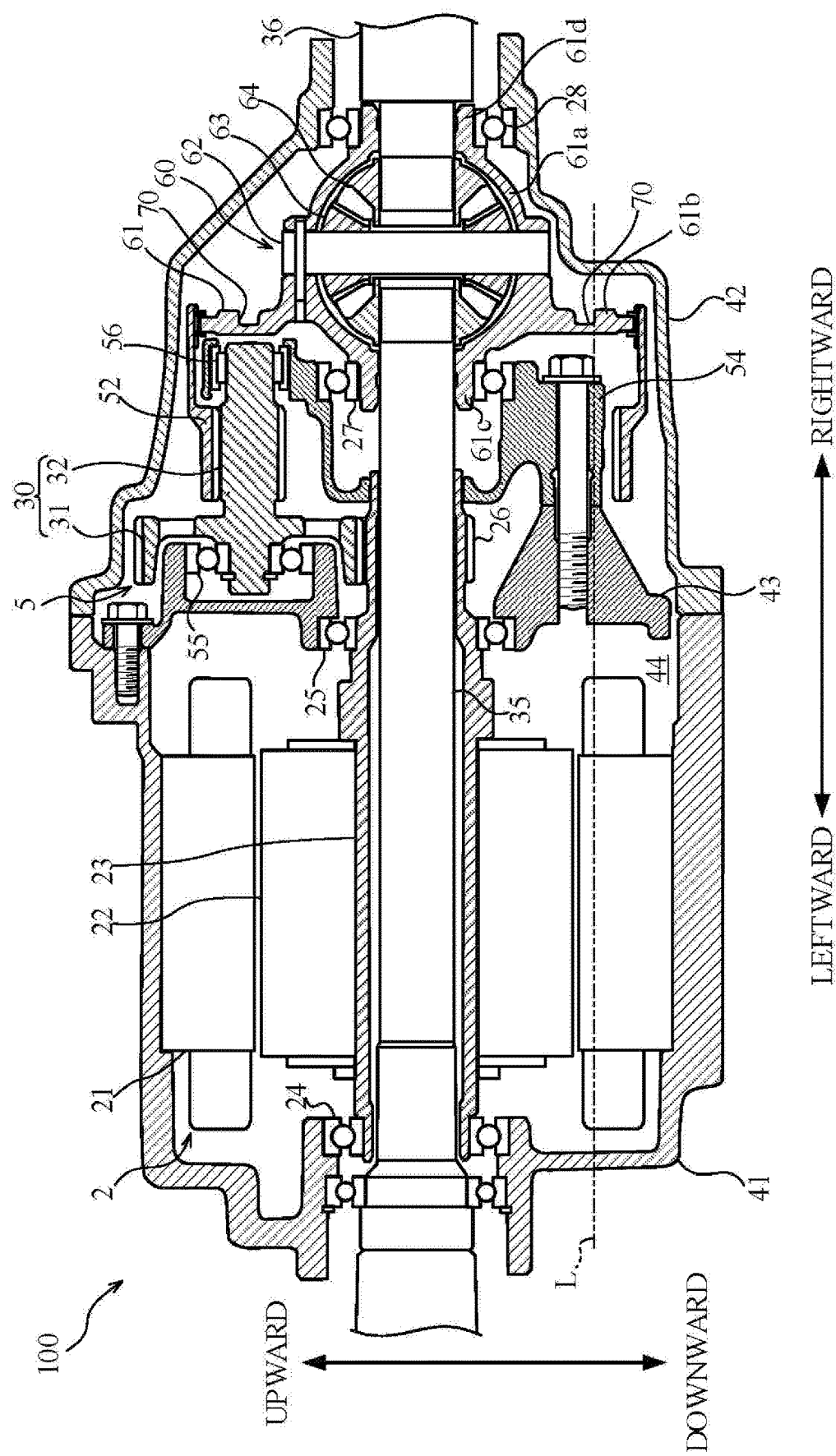
FIG. 1 is a sectional view showing a power transmission apparatus including a differential apparatus according to an embodiment of the present invention.

FIG. 1 is a sectional view showing the power transmission apparatus 100. First, referring to FIG. 1, the configuration of the power transmission apparatus 100 will be described. For convenience, the up-down direction and left-right direction are defined as shown in FIG. 1, and the configuration of the components will be described in accordance with these directions.

The electric motor 2, a reduction gear train 5, and the differential apparatus 60 are housed side by side in the left-right direction in the cases 41, 42 of the power transmission apparatus 100. The power of the electric motor 2 is reduced in speed and transmitted to the differential apparatus 60 by the reduction gear train 5 and distributed to left and right output shafts 35, 36 (axles) by the differential apparatus 60.

The electric motor 2 includes a stator 21, a rotor 22, and a rotor shaft 23. The rotor shaft 23 is rotatably supported by the case 41 and a holder 43 through bearings 24, 25.

The reduction gear train 5 includes a rotor gear 26, a plurality of (three) counter gears 30, and a ring gear 52. The rotor gear 26 is formed on an axial end of the rotor shaft 23 and rotationally driven by the electric motor 2. Each counter gear 30 includes a large-diameter gear 31 engaged with the rotor gear 26 and a small-diameter gear 32 engaged with the ring gear 52.

Both ends of each counter gear 30 are rotatably supported by the holder 43 and a holder 54 through bearings 55, 56. An axially extending portion of the ring gear 52 is coupled to a differential case 61 of the differential apparatus 60. One journal 61c disposed on the differential case 61 is rotatably supported by the holder 54 through a bearing 27. The other journal 61c disposed on the differential case 61 is rotatably supported by a case 42 through a bearing 28.

The rotation of the rotor gear 26 is reduced in speed and transmitted to the differential case 61 by the counter gears 30 and ring gear 52. The counter gears 30 are formed so as to be circumferentially arranged and engaged with the ring gear 52 and thus the outer diameter of the reduction gear train 5 can be set so as to be equivalent to that of the electric motor 2. In other words, such formation of the counter gears 30 allows the heights of the electric motor 2 and reduction gear train 5 to be made uniform in the left-right direction, allowing the spaces in the cases 41, 42 to be utilized efficiently.

The differential apparatus 60 includes a pair of pinion gears 63 and a pair of side gears 64 serving as a differential mechanism 6. The pinion gears 63 are rotatably supported by the differential case 61 around a shaft 62. The differential case 61 and shaft 62 rotate with the ring gear 52. When the two pinion gears 63 supported by the shaft 62 revolve, the left and right side gears 64 engaged with the pinion gears 63 rotate. Thus, the power transmitted to the differential case 61 is distributed to the left and right output shafts 35, 36 coupled to the left and right side gears 64. The left output shaft 35 is disposed so as to pass through the hollow rotor shaft 23.

The internal space of the cases 41, 42 is partitioned into a space containing the electric motor 2 and a space containing the reduction gear train 5 and differential apparatus 60 by the holders 43, 54. The bottoms of the cases 41, 42 form a storage 44, which is the internal space of the cases 41, 42. The storage 44 stores oil (liquid medium). During a stop of rotation of the power transmission apparatus 100, the oil level of the oil stored in the storage 44 is located in a position L1 shown in FIG. 1. During rotation of the power transmission apparatus 100, the oil stored in the storage 44 is scooped up by the counter gears 30, rotor 22, ring gear 52, differential case 61, and the like, and the components in the cases 41, 42 are lubricated by the scooped-up oil. That is, the components in the power transmission apparatus 100 are lubricated by so-called natural lubrication without using a pump.

Next, referring to FIGS. 2 to 4B, the lubrication structure of the differential apparatus 60 will be described. The terms "radial direction," "circumferential direction," and "axial direction" refer to a radial direction around a rotation axis O, a circumferential direction around the rotation axis O, and the extending direction of the rotation axis O, respectively.

Figure 2:
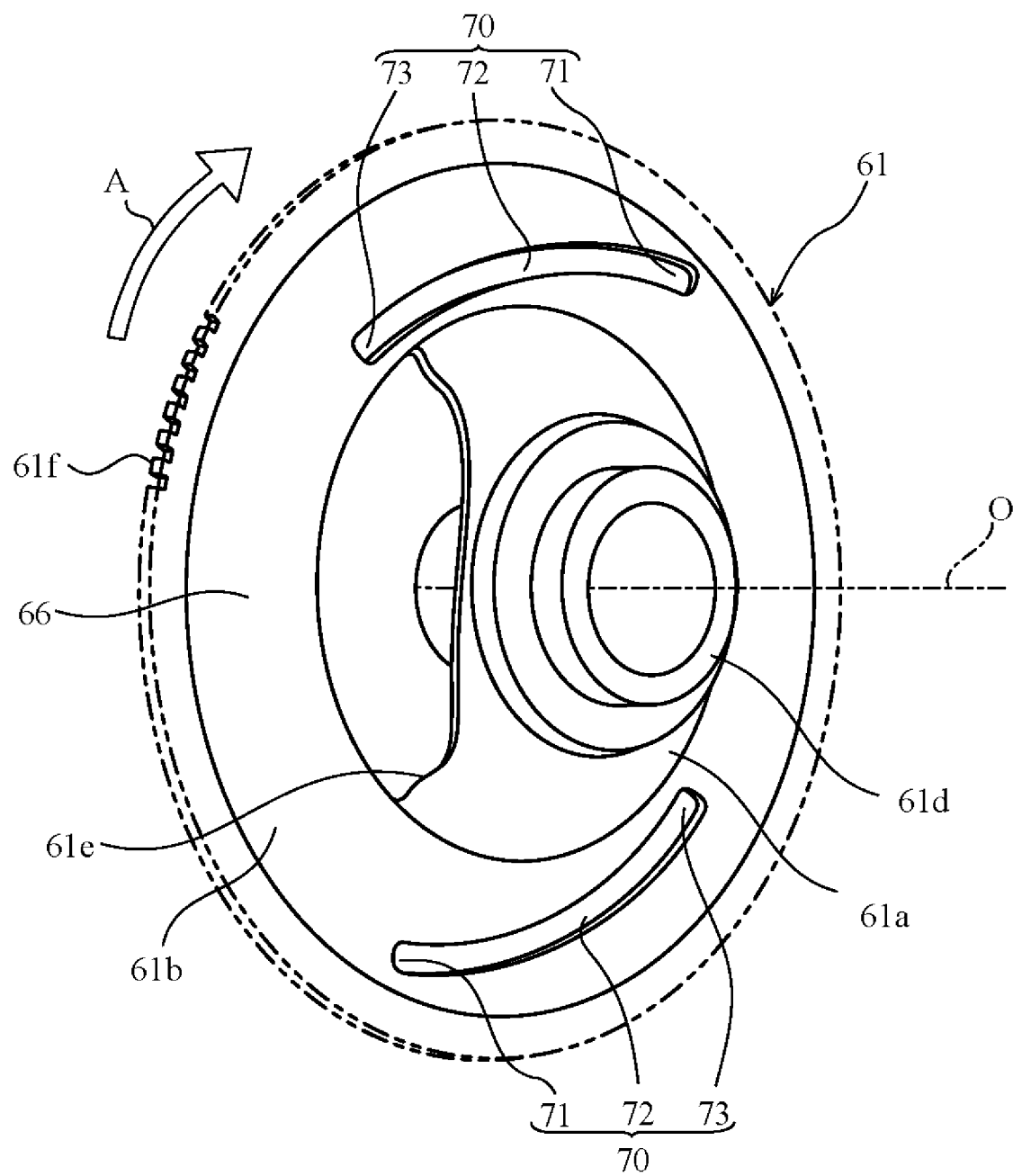
FIG. 2 is a perspective view of a differential case.

FIG. 2 is a perspective view of the differential case 61 partially omitted to simplify the description. The differential case 61 includes a hollow housing 61a housing the differential mechanism 6, a flange 61b extending from the outer circumference of the housing 61a in a disc shape, and journals 61c (FIG. 1), 61d extending cylindrically from both ends of the housing 61a. The differential case 61 has two open windows 61e for introducing the oil into the housing 61a. The outer circumferential edge of the flange 61b is provided with a spline 61f coupled to the ring gear 52.

The differential case 61 is a rotor that rotates around the rotation axis O. It transmits power to the differential mechanism 6, as well as scoops up the oil and supplies the scooped-up oil to the differential mechanism 6. The flange 61b of the differential case 61 is provided with two grooves 70 for scooping up the oil. The two grooves 70 are circumferentially extend so as to surround the housing 61a, and form a shape that is symmetrical with respect to the rotation axis O. Note that the number of grooves 70 is not limited to two and may be one or three or more.

The differential case 61 rotates in the direction of an arrow A around the rotation axis O. The grooves 70 circumferentially extend. A portion between the front end 71 and rear end 73 of each groove 70 in the rotation direction of the differential case 61 is referred to as a guide portion 72.

Figure 3:
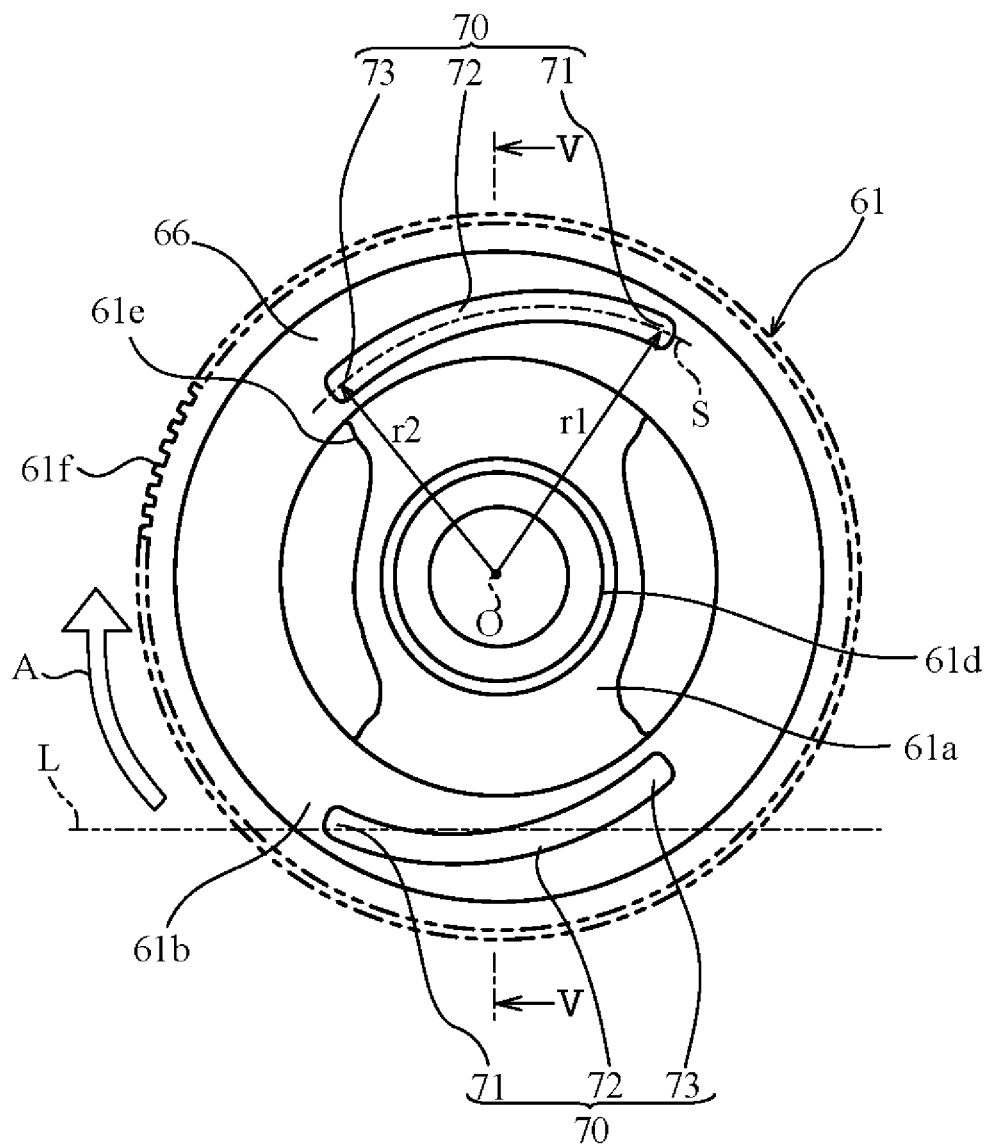
FIG. 3 is a side view showing the differential case.

FIG. 3 is a side view showing the differential case 61. The front end 71 of each groove 70 is formed in a position remote from the rotation axis O than the rear end 73, that is, in a more outside position than the rear end 73 in the rotation radial direction. The guide portion 72 extends such that portions thereof closer to the rear end 73 are closer to the rotation axis O. The center line S of each groove 70 is disposed such that portions thereof closer to the rear end 73 are closer to the rotation axis O. The front end 71 is disposed near the outer circumference of the flange 61b, and the center line S thereof is distant from the rotation axis O by a distance r1. The rear end 73 is disposed near the windows 61e, and the center line S thereof is distant from the rotation axis O by a distance r2. The distance r2 is smaller than the distance r1.

Figure 4A:
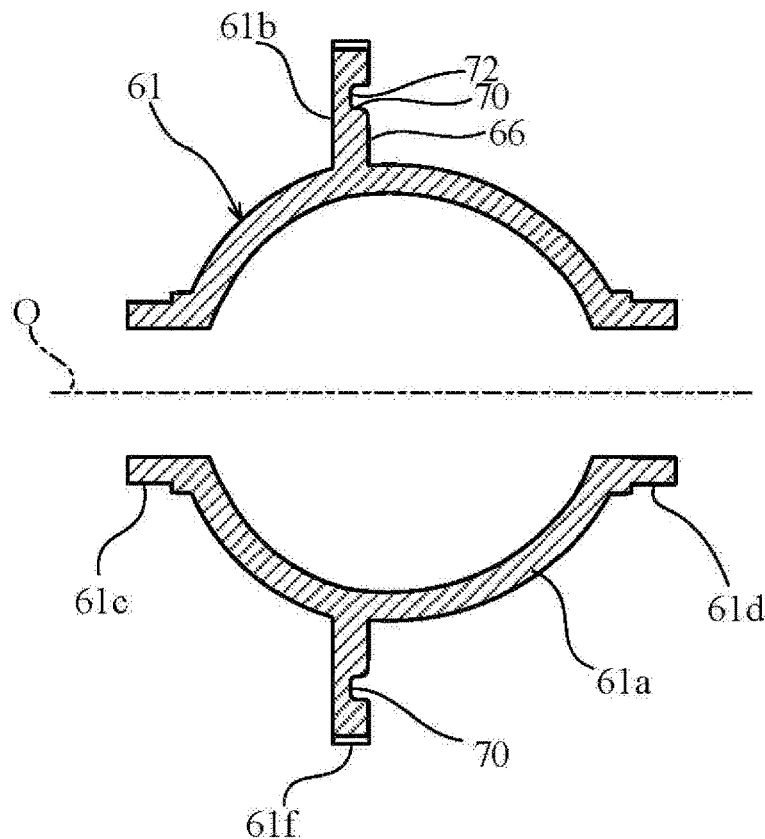
FIG. 4A is a sectional view along line V-V in FIG. 3.
Figure 4B:
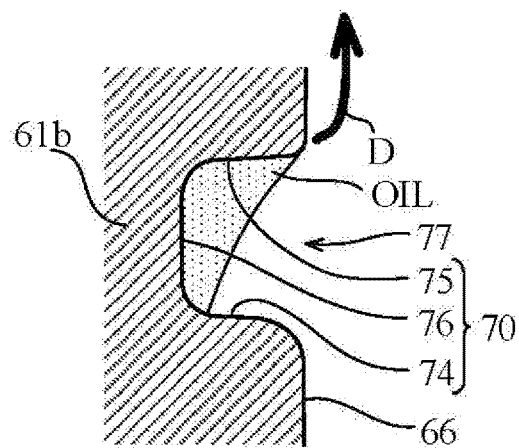
FIG. 4B is a partial enlarged view of FIG. 4A showing a groove and the vicinity thereof.

FIG. 4A is a sectional view along line V-V in FIG. 3, and FIG. 4B is a partial enlarged view of FIG. 4A showing a groove 70 and the vicinity thereof. As shown in FIGS. 4A, 4B, the flange 61b includes an end wall 66 intersecting (perpendicular to) the rotation axis O, and the grooves 70 are open to the end wall 66. That is, openings 77 of the grooves 7 and, more specifically, opening surfaces located on the surfaces of the end wall 66 are formed (disposed) on a plane that intersects the rotation axis O, for example, is perpendicular thereto.

The openings 77 need not be perpendicular to the rotation axis O. However, to form the guide portions 72 such that portions thereof closer to the rear ends 73 are closer to the rotation axis O, the openings 77 are preferably approximately perpendicular to the rotation axis O.

Each groove 70 is formed on the differential case 61 (flange 61b) so as to be recessed with respect to the corresponding end wall 66. It has an outer circumferential surface 75 that opposes to the rotation axis O and extends circumferentially, an inner circumferential surface 74 that opposes to the outer circumferential surface 75 and extends circumferentially, and a bottom surface 76 that extends between the outer circumferential surface 75 and inner circumferential surface 74.

Figure 5A:
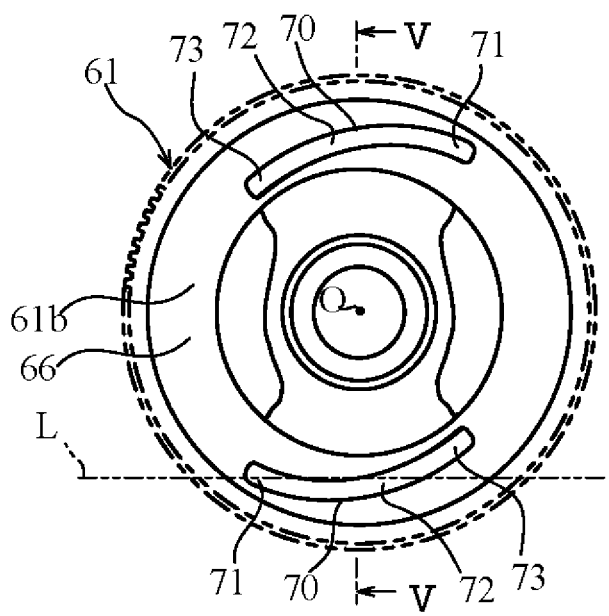
FIG. 5A is a side view of the differential case showing a situation of lubrication conducted in the differential apparatus.
Figure 5B:
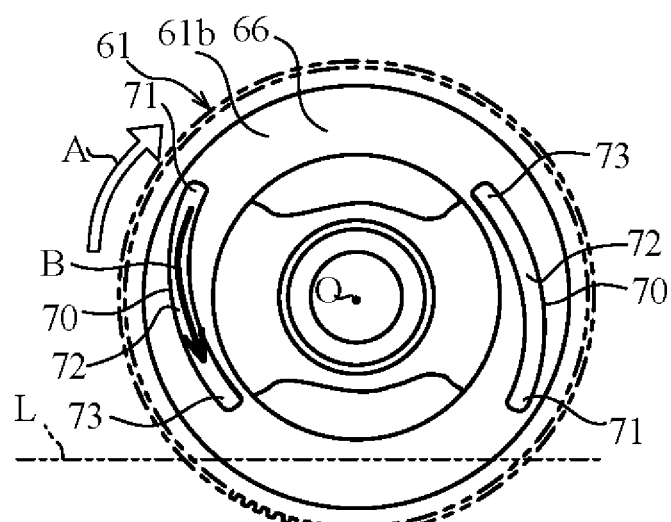
FIG. 5B is a side view of the differential case showing a situation of lubrication conducted in the differential apparatus, subsequent to FIG. 5A.
Figure 5C:
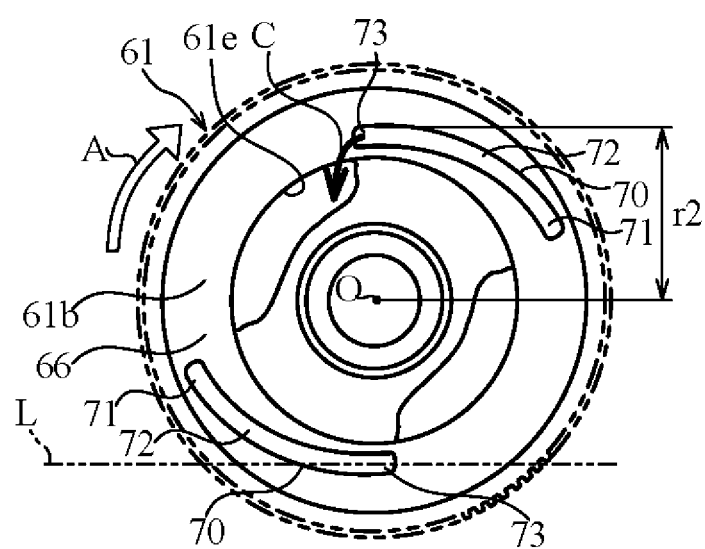
FIG. 5C is a side view of the differential case showing a situation of lubrication conducted in the differential apparatus, subsequent to FIG. 5B.

FIGS. 5A to 5C are side views of the differential case 61 showing states in which lubrication is performed in the differential apparatus 60 during start and low-speed travel of the vehicle. Referring now to FIGS. 4B to 5C, the flow of the oil will be described.

First, in the state shown in FIG. 5A, the front end 71 of a groove 70 located in a lower side in the gravity direction is immersed in the oil stored in the storage 44, and the oil is introduced into the groove 70 through the front end 71.

Then, as shown in FIG. 5B, when the differential case 61 rotates, the groove 70 on the lower side in the gravity direction moves upward in the gravity direction (rises), as shown by an arrow A. The oil introduced into the groove 70 through the front end 71 flows to the rear end 73 through the guide portion 72 an inertial force and gravity, as shown by an arrow B. That is, the oil flows inward in the rotation radial direction through the groove 70.

At this time, the oil flows along the outer circumferential surface 75 of the guide portion 72 while receiving a centrifugal force, as shown in FIG. 4B. While part of the oil flows out of the groove 70, as shown by an arrow D, the remaining oil flows to the rear end 73 along the guide portion 72. As seen above, the oil is guided by the groove 70 so as to flow inward in the rotation radial direction.

Then, as shown in FIG. 5C, when the differential case 61 further rotates and thus the groove 70 moves to above the housing 61a, the oil flows out of the rear groove 70 through the rear end 73 while receiving the inertial force and gravity, as shown by an arrow C, and flows down to the differential mechanism 6 (FIG. 1) in the housing 61a through a corresponding window 61e. Since the rear end 73 of the groove 70 is disposed in a more front position in the rotation direction than the circumferential front end of the window 61*e*, the oil flowing rearward in the rotation direction out of the groove 70 while receiving the inertial force can be efficiently introduced into the housing 61*a* through the window 61*e*.

Since the rear end 73 of the groove 70 is formed in a more inside position in the rotation radial direction than the front end 71, the centrifugal force acting on the oil on the rear end 73 is smaller than that on the front end 71. Accordingly, the oil easily flows down from the groove 70 by gravity. The centrifugal force m·r2·ω2 acting on the oil on the rear end 73 is smaller than the centrifugal force m·r1·ω2 acting on the oil on the front end 71 where m represents the mass of the oil; and ω represents the rotation speed of the differential case 61. Since the centrifugal force acting on the oil on the rear end 73 of the groove 70 is smaller than that on the front end 71, the oil easily flows down out of the groove 70 against the centrifugal force while receiving gravity.

While when the rotation speed of the differential case 61 is somewhat low, the amount of lubrication by stirring is small. However, as described above, the oil flows inward in the rotation radial direction and is supplied to the differential mechanism 6 against the centrifugal force while receiving gravity. Thus, the differential mechanism 6 can be sufficiently lubricated.

Note that as a comparative example, it is conceivable to dispose an oil storage bucket (recess) on the flange of the differential case so that the oil scooped up by the bucket flows down to the differential mechanism. However, in this case, the oil in the bucket does not flow inward in the rotation radial direction. Accordingly, the oil in the bucket can flow down into the differential mechanism against the centrifugal force only while the rotation speed of the differential case is extremely low.

The differential apparatus 60 of the present embodiment moves the oil scooped up by the groove 70 inward in the rotation radial direction along the guide portion 72. Thus, the rotation speed range in which the oil is supplied to the differential mechanism 6 by gravity can be expanded to a higher speed range than that in the comparative example.

During start of the vehicle and during low-speed travel thereof before the vehicle speed is increased to some level after the start, the differential apparatus 60 can sufficiently lubricate the differential mechanism 6 using the oil supplied through the grooves 70. During high-speed travel of the vehicle where the vehicle speed is higher than a predetermined speed, the oil stirred by the ring gear 52, differential case 61, and the like is scattered and supplied to the differential mechanism 6. Thus, the differential mechanism 6 can be sufficiently lubricated.

Figure 6A:
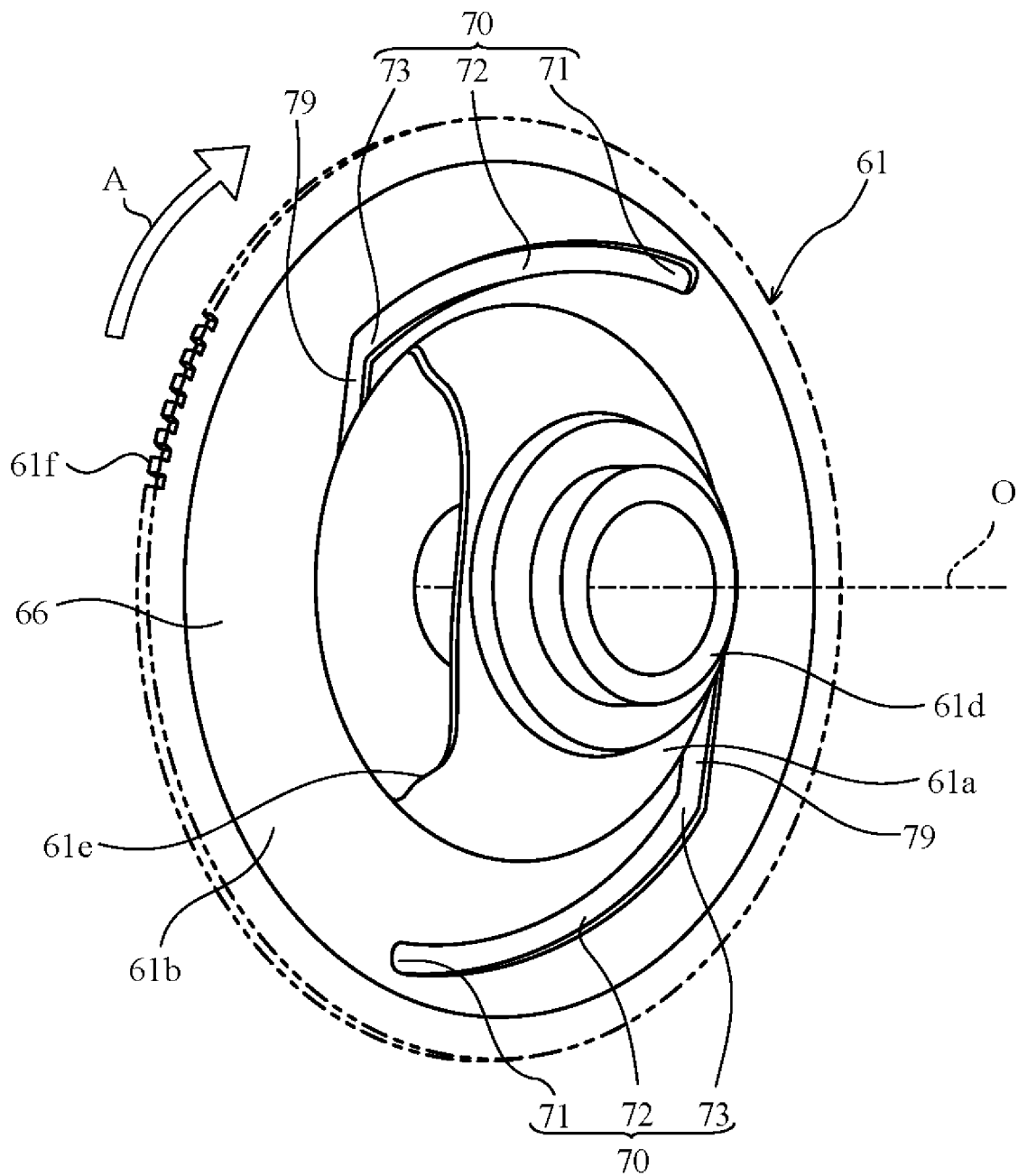
FIG. 6A is a perspective view showing a modification of FIG. 2.

FIG. 6A is a modification of FIG. 2. As shown in FIG. 6A, in this differential case 61, introduction parts 79 are disposed so as to extend rearward in the rotation direction and inward in the rotation radial direction from the rear ends 73 of the grooves 70. An end of each introduction part 79 communicates with the housing 61*a* housing the differential mechanism 6. That is, the introduction part 79 forms a communication groove. While, in FIG. 6A, the introduction parts 79 are disposed obliquely so as to extend radially and circumferentially from the rear ends 73, they may be disposed at a steeper or more gentle inclination angle than that shown in FIG. 6A and may have a curved shape rather than a linear shape.

Figure 6B:
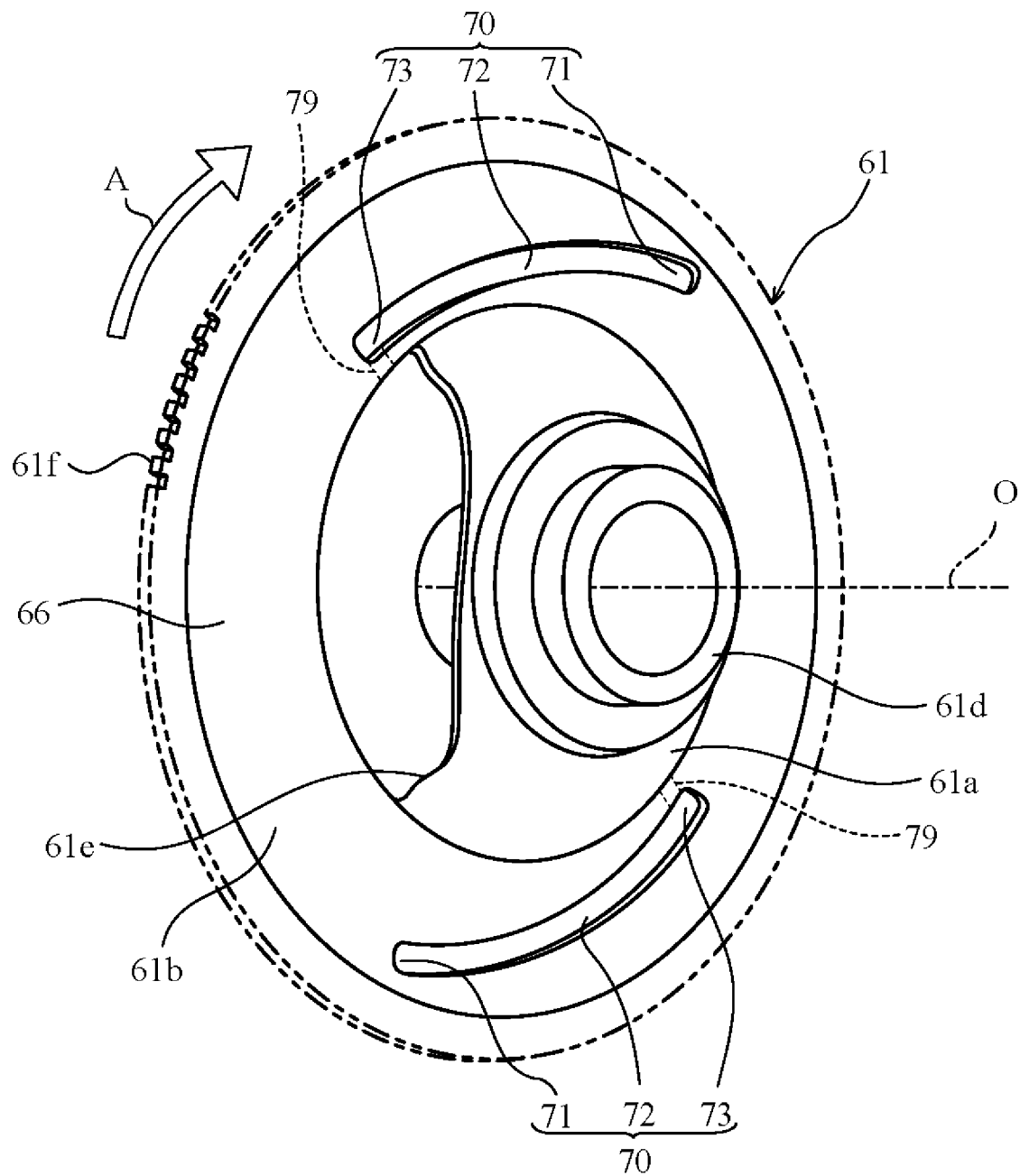
FIG. 6B is a perspective view showing a modification of FIG. 6A.

FIG. 6B is a modification of FIG. 6A. As shown in FIG. 6B, the introduction parts 79 may be formed as communication holes each having one end which is open to a corresponding rear end 73 and the other end which is open to the inner wall surface of the housing 61*a*. While, in FIG. 6B, the introduction parts 79 are formed so as to extend inward in the radial direction from the rear ends 73 of the grooves 70, the introduction parts 79 may be formed as communication holes that extend rearward in the rotation direction and inward in the rotation radial direction from the rear ends 73.

In this case, during operation (rotation) of the differential apparatus 60, the oil guided to the rear ends 73 of the grooves 70 flows down into the housing 61*a* through the introduction parts 79 while receiving an inertial force and gravity and is then supplied to the differential mechanism 6. Thus, the amount of oil supplied to the differential mechanism 6 can be increased.

Figure 7A:
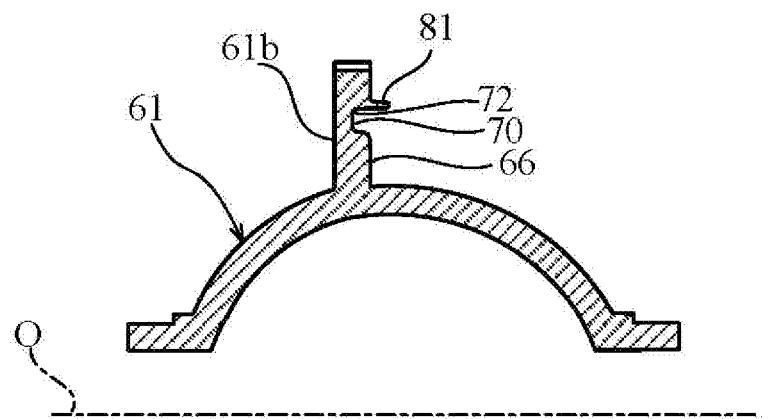
FIG. 7A is a sectional view showing a modification of FIG. 4A.

Next, a modification of the differential case 61 shown in FIGS. 7A, 7B will be described. As shown in FIG. 7A, the differential case 61 is provided with ribs 81 that protrude axially from the end wall 66 along the outer circumferences of the grooves 70. The ribs 81 form surfaces that extend axially from the outer circumferential surfaces 75 of the guide portions 72.

Figure 7B:
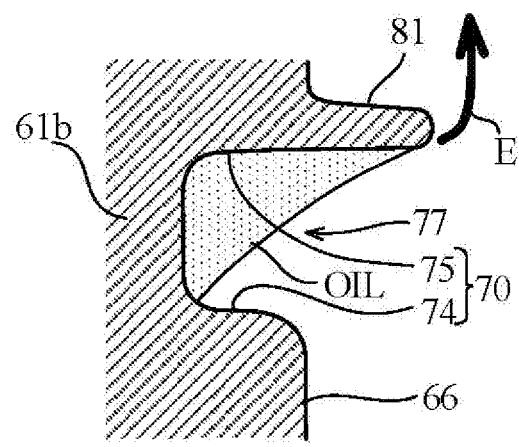
FIG. 7B is a partial enlarged view of FIG. 7A showing the vicinity of the groove.

In this case, during operation of the differential apparatus 60, the width of the flow path of the oil flowing along the outer circumferential surfaces 75 while receiving a centrifugal force is increased by the ribs 81, as shown in FIG. 7B. Thus, the amount of oil flowing out of the grooves 70 as shown by an arrow E is reduced. Since the oil is guided by the grooves 70 and ribs 81 in this manner, the amount of oil supplied to the differential mechanism 6 can be increased.

Figure 8A:
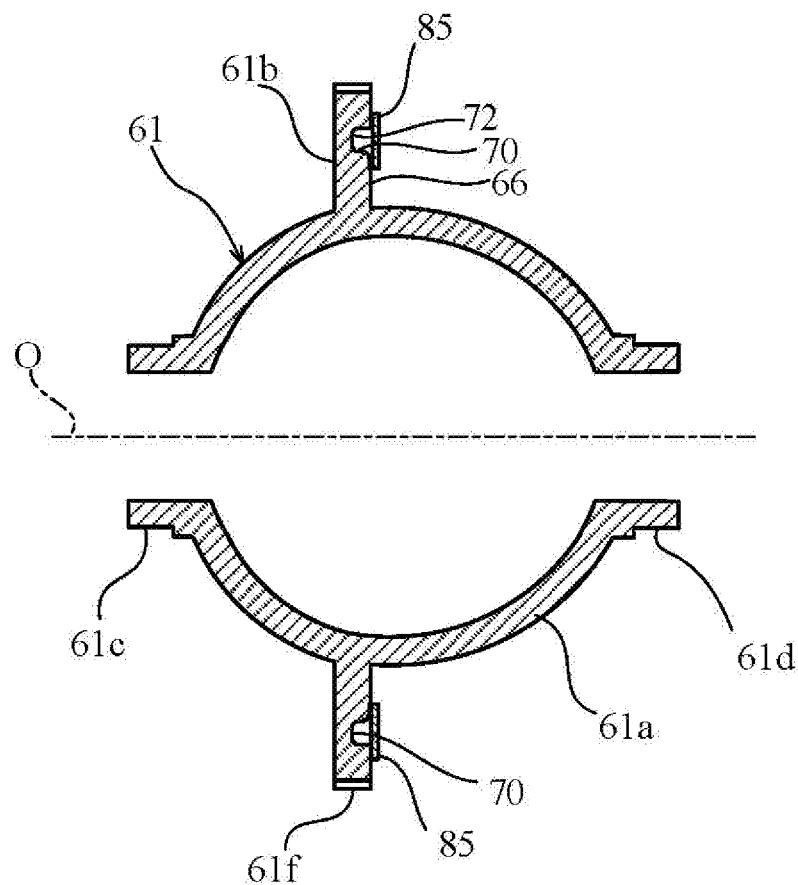
FIG. 8A is a sectional view showing another modification of FIG. 4A.

Next, a modification of the differential case 61 shown in FIGS. 8A, 8B will be described. As shown in FIG. 8A, the differential case 61 is provided with lids 85 that partially block the openings 77 of the grooves 70. Specifically, the lids 85 are disposed in positions that block the guide portions 72 but do not block the front ends 71 or rear ends 73. The tabular lids 85 are joined to the end wall 66.

Figure 8B:
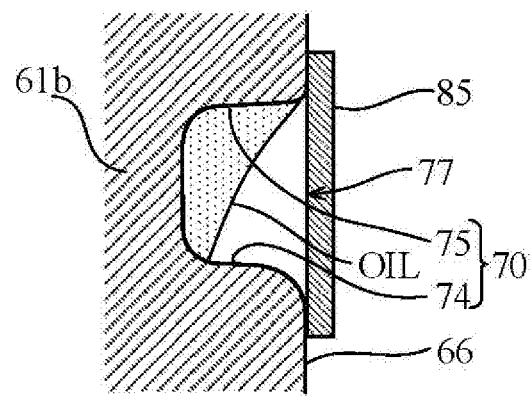
FIG. 8B is a partial enlarged view of FIG. 8A showing the vicinity of the groove.

In this case, during operation of the differential apparatus 60, the oil flows along the outer circumferential surfaces 75 and lids 85 while receiving a centrifugal force, as shown in FIG. 8B. Thus, the oil is prevented from flowing out of the grooves 70. Since the oil is guided by the grooves 70 and ribs 85 in this manner, the amount of oil supplied to the differential mechanism 6 can be increased.

Figure 9A:
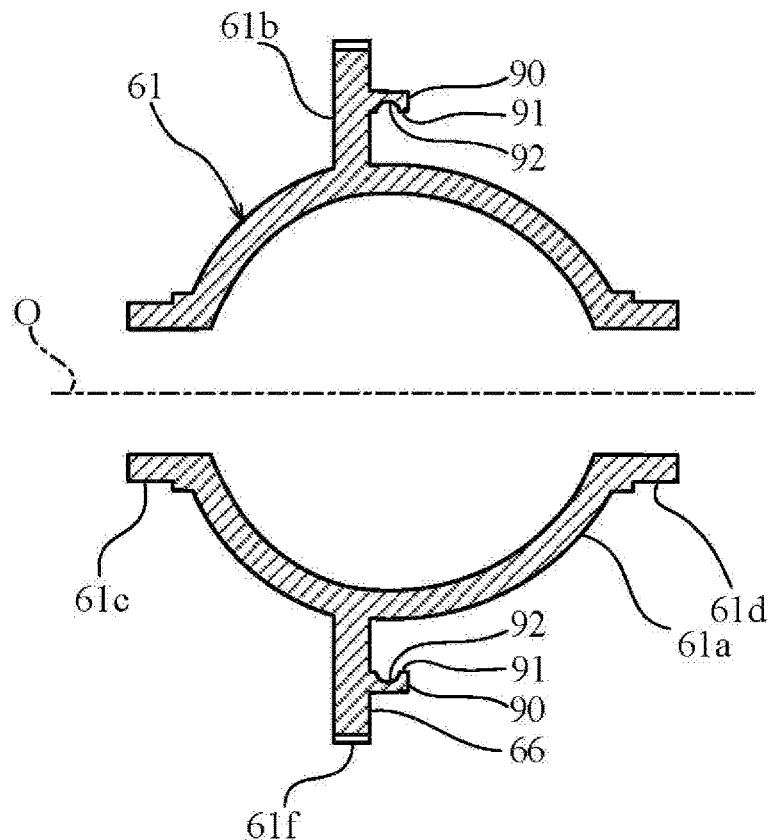
FIG. 9A is a sectional view showing a further modification of FIG. 4A.

Next, a modification of the differential case 61 shown in FIGS. 9A, 9B will be described. As shown in FIG. 9A, the differential case 61 is provided with protrusions 90 that protrude axially from the end wall 66 of the flange 61*b*. Each protrusion 90 has an inner circumferential wall 91 that extends so as to oppose to the rotation axis O, and the inner circumferential wall 91 is provided with a groove 92. An opening 93 of the groove 92 opposes to the rotation axis O.

Figure 9B:
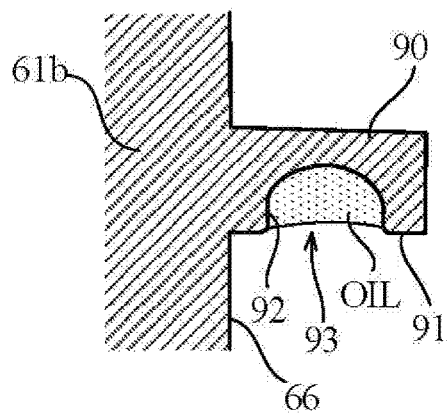
FIG. 9B is a partial enlarged view of FIG. 9A showing the vicinity of the groove.

In this case, during operation of the differential apparatus 60, the oil scooped up by the protrusions 90 flows along the grooves 92 of the inner circumferential walls 91, as shown in FIG. 9B. Thus, the oil is prevented from flowing out of the grooves 92. Since the oil is guided by the grooves 92 in this manner, the amount of oil supplied to the differential mechanism 6 can be increased.

The present embodiment can produce the following advantageous effects:

(1) The differential apparatus 60 of the present embodiment includes the differential case 61 that rotates around the rotation axis O and transmits power to the differential mechanism 6 and the grooves 70, 92 that are formed on the differential case 61 and guide the oil scooped up by rotation of the differential case 61 inward in the rotation radial direction (FIGS. 1 to 9).

Thus, the differential apparatus 60 moves the oil scooped up by the grooves 70 inward in the rotation radial direction (in a direction in which the oil approaches the rotation axis O). As a result, the centrifugal force acting on the oil is reduced, and the rotation speed range in which the oil is supplied to the differential mechanism 6 by gravity is expanded to a higher range. Also, the differential apparatus 60 is realized by deforming the differential case 61. This means that the part count is not increased, avoiding upsizing of the apparatus.

(2) The front ends 71 of the grooves 70, 92 in the rotation direction of the differential case 61 are formed in more outside positions in the rotation radial direction than the rear ends 73 in the rotation direction of the grooves 70, 92 of the differential case 61. The oil guide portions 72 between the front ends 71 and rear ends 73 of the grooves 70, 92 extend such that portions thereof closer to the rear ends 73 are closer to the rotation axis O of the differential case 61 (FIGS. 1 to 9).

Thus, the differential apparatus 60 moves the oil scooped up by the grooves 70, 92 inward in the rotation radial direction (in a direction in which the oil approaches the rotation axis O) along the guide portions 72. As a result, the centrifugal force acting on the oil is reduced, and the rotation speed range in which the oil is supplied to the differential mechanism 6 by gravity is expanded to a higher range.

(3) The openings 77 of the grooves 70 are formed on a plane perpendicular to the rotation axis O of the differential case 61 (FIGS. 1 to 8). Thus, when molding the differential case 61 during production of the differential apparatus 60, a mold for forming the grooves 70 can be extracted in the direction of the rotation axis O. This allows for avoidance of complication of the step of molding the differential case 61, allowing for suppressing an increase in the production cost of the differential apparatus 60.

(4) The differential apparatus 60 includes the ribs 81 formed on the differential case 61 so as to axially protrude along the outer circumferences of the grooves 70 (FIG. 7). This allows for an increase in the width of the flow path of the oil flowing through the grooves 70, allowing for an increase in the amount of oil guided to the differential mechanism 6 by the grooves 70.

(5) The differential apparatus 60 includes the lids 85 disposed on the differential case 61 so as to partially block the openings 77 of the grooves 70 (FIG. 8). This allows the lids 85 to stop a flow of the oil out of the grooves 70, allowing for an increase in the amount of oil guided to the differential mechanism 6 by the grooves 70.

(6) The openings 93 of the grooves 92 are formed on the differential case 61 so as to oppose to the rotation axis O of the differential case 61 (FIG. 9). This allows for prevention of a flow out of the grooves 92 by the centrifugal force, of the oil that has entered the grooves 92, allowing for an increase in the amount of oil guided to the differential mechanism 6 by the grooves 92.

(7) In the differential apparatus 60, the differential case 61 is provided with the grooves 70, 92 (FIGS. 1 to 9). That is, the differential apparatus 60 is realized by deforming the differential case 61. This means that the part count is not increased, avoiding upsizing of the apparatus.

While, in the above embodiment, the differential case 61 is provided with the grooves 70, 92, a member (rotor) different from the differential case 61 may be provided with the grooves 70, 92.

(8) The differential apparatus 60 includes the introduction parts 79 that are formed on the differential case 61 and guide the oil from the grooves 70 into the differential case 61 (FIGS. 6A, 6B). Thus, the oil guided to the rear ends 73 of the grooves 70 flows into the differential case 61 through the introduction parts 79. This allows for an increase in the amount of oil guided to the differential mechanism 6 by the grooves 70 and introduction parts 79.

While the example in which the differential apparatus 60 is applied to the power transmission apparatus 100 of the vehicle has been described, the differential apparatus of the present invention can also be applied to apparatuses used for other than a vehicle.

The above embodiment can be combined as desired with one or more of the above modifications. The modifications can also be combined with one another.

According to the present invention, since oil scooped up by a groove moves inward in the rotation radial direction, a centrifugal force acting on oil becomes smaller. With this, a rotation speed range in which the oil is supplied down to the differential mechanism by gravity can be expanded to a higher speed range. Therefore, a part count of the differential apparatus is not increased, thereby avoiding upsizing of the differential apparatus.

Above, while the present invention has been described with reference to the preferred embodiments thereof, it will be understood, by those skilled in the art, that various changes and modifications may be made thereto without departing from the scope of the appended claims.

What is claimed is:

1. A differential apparatus comprising:
   a differential case configured to house a differential mechanism and rotate around a rotation axis to transmit power to the differential mechanism; and
   a groove formed on an outer surface of the differential case and configured to guide an oil scooped up by rotation of the differential case inward in a rotation radial direction of the differential case, wherein
   an opening portion of the groove is formed on a surface perpendicular to the rotation axis of the differential case, wherein
   the differential apparatus further comprises:
      a rib formed on the differential case so as to protrude axially along an outer circumference of the groove.

2. The differential apparatus according to claim 1, wherein
   a front end portion of the groove in a rotation direction of the differential case is formed outward in the rotation radial direction of the differential case than a rear end portion of the groove in the rotation direction of the differential case, wherein
   an oil guiding portion between the front end portion and the rear end portion of the groove extends so as to get closer to the rotation axis of the differential case gradually from the front end portion to the rear end portion.

3. The differential apparatus according to claim 1, further comprising:
   a lid provided on the differential case so as to partially block the opening portion of the groove.

4. The differential apparatus according to claim 1, wherein
   the opening portion of the groove is formed on the differential case so as to oppose to the rotation axis of the differential case.

5. The differential apparatus according to claim 1, further comprising:

an introducing portion formed on the differential case to introduce the oil from the groove into the differential case.

\* \* \* \* \*